Patented Nov. 14, 1944

2,362,538

UNITED STATES PATENT OFFICE 2,362,538

COMPOSITIONS OF RUBBER AND GELLED SOLUTION OF SHELLAC IN A GLYCOL

Solomon Caplan, New York, N. Y., assignor to Harvel Research Corporation, a corporation of New Jersey No Drawing. Application October 7, 1942, Serial No. 461,201

5 Claims. (Cl. 260—755)

The present invention relates to polymerized shellac and to compositions containing rubber and polymerized shellac, and the present invention also relates to methods and steps for making and using polymerized shellac.

This application is a continuation in part of my copending application Ser. No. 146,207, filed June 3, 1937, and matured into Patent 2,301,253, November 10, 1942.

According to the present invention shellac is polymerized with an agent such as sulphuric acid, phosphoric acid, zinc chloride, diethyl sulphate or other dialkyl sulphate or an aromatic sulphate such as phenyl sulphate or mixed, dihydrocarbon sulphate such as ethyl methyl sulphate or ethyl phenyl sulphate, acid mono methyl sulphate, acid mono ethyl sulphate or other acid mono alkyl sulphate, acid mono aromatic sulphate such as acid mono phenyl sulphate.

As one illustrative example of the practice of the methods of the present invention and of the product thereof the following is given.

Example 1

About ten pounds of shellac are dissolved in three gallons of ethyl alcohol and 0.8 pound of concentrated sulphuric acid added and dissolved in the solution, after which the whole is heated to about 80° C. for about 5 hours under a reflux condenser after which the alcohol is removed by further heating. The resulting polymerized shellac, which is a rubbery mass, can be washed and neutralized and dried and then milled into rubber and is valuable for use in rubber to give to the latter oil and solvent resistance. Suitable proportions of shellac polymer to rubber, given here as illustrative example are from about 1 part to about 5 parts of shellac polymer to 1 part of rubber.

Suitable proportions of sulphuric acid to shellac are from about one-half part, or less by weight, to about ten parts by weight of sulphuric to one hundred parts by weight of shellac.

In place of using sulphuric acid as in the above example, an alkyl sulphate can be used, for example, diethyl sulphate in amount from about one-half part by weight or less to about ten parts by weight for each hundred parts by weight of shellac to be polymerized. The diethyl sulphate or other hydrocarbon sulphate can be used without a solvent, being miscible with shellac when the latter is heated to bring it into the liquid condition.

Also a solvent can be used which acts as a plasticizer or which enters into the reaction. Such materials are ethylene glycol, propylene glycol, diethylene glycol and polyethylene glycol of molecular weights up to 400. The following is an example of the polymerization of shellac with diethylene glycol and the use of the latter in and with the shellac polymer as a modifying composition for rubber.

Example 2

| | Pounds |
|---|---|
| Delta shellac | 10 |
| Diethylene glycol | 4 |
| Diethyl sulfate | 0.3 |

The mixture of shellac and diethylene glycol was heated to 250° F. until a homogeneous mixture resulted whereupon the diethyl sulfate was stirred in. The mixture was placed in an oven at 270° F. for 16 hours and the resulting rubbery mass was washed on a rubber mill with water. It was then sheeted out and again placed in an oven at 150° F. for removal of residual moisture. This material can be worked on the rubber mill, with or without the addition of rubber, and is unaffected by water or petroleum hydrocarbons.

The proportions of shellac and diethylene glycol can be varied widely depending on the degree of softness desired.

Ethylene glycol can be used instead of diethylene glycol and, while not as good a solvent for the shellac, gives with shellac by the process above described generally for diethylene glycol a desirable product suitable for many uses. In addition, propylene glycol and polyethylene glycol of various molecular weights up to 400 have been tried as solvents for shellac in accordance with the procedure of Example 2 and have been found to give materials which are in all respects satisfactory.

The use of polymerized shellac with rubber as described above is given as an illustrative example of the use of polymerized shellac. And it is to be understood that in the use of polymerized shellac in rubber, the rubber can have other materials added thereto such as are generally used in the practice of rubber goods manufacture. For example, the following are illustrative formulas for rubber mixtures for general use:

Example 3

4 parts by weight of acid polymerized shellac,
1 part by weight of rubber,
3% of the above total weight in sulphur,
3% of the above total weight in zinc oxide,
½% of the above total weight in hexamethylene tetramine, milled together on the mixing rolls,

*Example 4*

1 part by weight of acid polymerized shellac
4 parts by weight of rubber
4% of the above total weight in sulphur
4% of the above total weight in zinc oxide
1½% of the above total weight in diphenyl guanidine.

*Example 5*

1 part by weight of polymerized butadiene rubber
1 part by weight of acid polymerized shellac
3% of the above total weight in sulphur
3% of the above total weight in zinc oxide
1% of the above total weight in tetramethylthiuram disulfide (Tuads).

The acid polymerized shellac of Examples 3, 4 and 5 can be any of the acid gelled solutions of shellac in glycols described previously.

The products of Examples 3, 4 and 5 and similar compositions of varying proportions of rubber and either the acid polymerized shellac or the acid gelled shellac in glycols, are noted particularly for their extreme resistance to the solvent actions of petroleum distillates. Those compositions containing higher proportions of the polymerized shellac and particularly those in which the gelled solutions of shellac in glycols are employed, have the greatest resistance to the solvent action of such oils as the petroleum distillates.

Any of the above described polymerized shellacs, that is with or without the glycols, can be sheeted out and calendered on cloth for general use such as rubber coated cloths are used, and an example of a particular use is for printing blankets, and also the rubber polymerized shellac compositions can be used in the same or similar ways. It will be clear that pigments and fillers can also be used such as is the general practice in the use of rubber.

Another example of the use of any of the above materials, mixtures and compositions involving the materials of the present invention is for floor covering in sheet or tile form, with or without the use of rubber, and in each case with or without the use of fillers and pigments such as carbon black, cork, iron oxide, slate dust, zinc oxide and the fillers and pigments and colorings generally used in making floor coverings from rubber.

Having thus described my invention, what I claim and desire to protect by Letters Patent, is:

1. A composition comprising rubber and an acid-gelled solution of shellac in a glycol whose molecular weight is no greater than 400.

2. A vulcanized composition comprising rubber, sulfur and an acid-gelled solution of shellac in a glycol whose molecular weight is no greater than 400.

3. A composition comprising rubber and an acid gelled solution of shellac in ethylene glycol.

4. A composition comprising rubber and an acid gelled solution of shellac in a polyethylene glycol having a molecular weight no greater than 400.

5. A composition comprising rubber and an acid gelled solution of shellac in diethylene glycol.

SOLOMON CAPLAN.